Patented Feb. 25, 1936

2,031,750

UNITED STATES PATENT OFFICE 2,031,750

METHOD FOR PURIFYING TITANIUM SUB-OXIDE MATERIALS

Foord von Bichowsky, Cleveland, Ohio, assignor to Krebs Pigment and Color Corporation, Wilmington, Del., a corporation of Delaware No Drawing. Application February 23, 1935, Serial No. 7,852

6 Claims. (Cl. 23—202)

This invention relates to the purification or opening up of titanium sub-oxide containing materials and will be fully understood from the following description thereof.

In U. S. Letters Patent No. 1,902,203 dated March 21, 1933, I have described methods for preparing pure titanium sub-oxide materials from ferrogenous titanium compounds, and in particular from the titanium ores rutile and ilmenite, by acting upon them at moderately elevated temperatures with various reducing agents. In this operation not only are the titanium oxygen compounds reduced but also a greater part of the oxides of iron. The iron resulting from this reduction is removed by means of acids or other agents. The silica or silicates present in the material are removed by a mechanical or chemical treatment.

The chemical treatment described in my patent broadly consisted in acting upon the ore with certain alkaline and/or alkaline earth materials either previous to or after the above described reduction. The purpose of this action being to cause the alkaline material to react with any silica compounds present to form substances soluble in dilute acids, water or other dissolving agent or agents. I found this general method satisfactory when working with ores or other materials low in silica or in other interfering or colored oxides but with materials higher in silica or in silicates such as zirconium silicates or in siliceous materials containing chromium, iron, nickel, vanadium and the like, this method was found to be less satisfactory.

When working with that type of material or ore it was found usually necessary to employ an excess of the alkaline or alkaline earth compounds and to operate at higher temperatures and it was then noted that a considerable loss of titanium occurred due to an unexpected reaction between the titanium sub-oxide material and the excess of the alkaline earth or other basic reactant.

In order to reduce this loss of valuable titanium material I found it necessary to attack the problem from another angle. A study of the literature suggested that it might be possible to convert the silica into the volatile fluoride and in this way make a separation of the titanium sub-oxide and the silica. I was however aware that hydrofluoric acid also acts upon both titanium dioxide (TiO2) and upon titanium sesquioxide (Ti2O3).

The literature gives, however, no information as to the action of hydrofluoric acid i. e. hydrogen fluoride upon titanium sub-oxide (Ti3O5) or upon titanium sub-oxide containing materials. I have now discovered that although titanium sub-oxide is apparently attacked under certain conditions that there are other conditions under which it is not attacked or at most is so slightly acted upon that no consequential loss of titanium occurs.

It must be pointed out that hydrofluoric acid or hydrogen fluoride, as it is often called, is exceptionally harmful to the human organism both in the form of gas or in its concentrated aqueous solution but I have found that by employing weak solutions or by operating in apparatus kept under less than atmospheric pressure or both that one can employ this poisonous and corrosive substance with comparative safety. The use of pressures below atmospheric also appears, in some cases, to increase the efficiency of the process probably by removing the silicon fluoride before it has time to undergo a decomposition of this type:

$$SiF_4 + 2H_2O = SiO_2 + 4HF$$

I will now give three examples of the methods that I have successfully used in separating silica and other substances, either in whole or in part, from titanium sub-oxide containing materials.

Example 1

One places 100 parts by weight of a titanium sub-oxide material, containing about 6 per cent of silica or silicates and about 2 per cent of iron oxide, together with 16 parts by weight of finely ground high grade calcium fluoride (fluor spar), in a covered iron pot equipped with a strong stirring mechanism and in which one can maintain a slight vacuum by means of a suitable suction device. About 2 per cent by weight of water is then added and one then stirs the ingredients well together. When this mixing is complete one pours in quite slowly 20 parts by weight of concentrated sulphuric acid.

The sulphuric acid generally reacts at once with the fluor spar and therefore care should be taken that the temperature of the mass does not rise above 140° C. If the reaction does not start upon the first addition of sulphuric acid the mass may be cautiously warmed. At this point or thereafter there is often a tendency for the mass to cake or form lumps or pellets and if the agitator employed does not overcome this tendency it is then desirable to use a mixer having self-cleaning Z or sigma blades or to use a muller or putty chaser type of mixer. When all the sulphuric acid has been poured into the reaction vessel the reaction is allowed to proceed until no further evolution of silicon fluoride or absorption of sulphuric acid takes place. To completely bring this reaction about it may be advisable to warm the pot or mixer slightly but it should be remembered that titanium sub-oxide is somewhat acted upon by strong sulphuric acid at temperatures around 140° C. As soon as the reaction is over the mass in the reaction vessel is allowed to cool, stirring being continued, and when cold the calcium sulphate, iron fluoride and other soluble substances are washed out of the mass For this purpose water or other solvent is employed. In place of the sulphuric acid in the above example, or in addition thereto, one may use phosphoric acid or acid salts such as sodium acid sulphate or sodium acid phosphate. In that event one may use weak acid or other solvents to leach out the phosphates formed. In some cases the siliceous impurities in the sub-oxide material may not all be removed by such treatment but they are usually so broken up or opened up that any therein contained iron or other substance is attackable by appropriate reagents. Instead of generating the hydrogen fluoride in situ as in the above example one may use commercial hydrogen fluoride gas but for reasons of economy and for other reasons I generally prefer to follow the method described above.

Example 2

One mixes well together 100 parts by weight of the titanium sub-oxide material, as was used in the first example, with 16 parts by weight of finely ground calcium fluoride and 20 parts by weight of ammonium chloride and warms the mixture in a lead container or lead lined mixer to just below the temperature at which ammonium chloride appreciably sublimes.

When fumes no longer come off from the apparatus or appear in the exhaust from the suction apparatus the contents of the mixer are tested. If the silicates have been sufficiently opened up or acted upon the reaction is ended. If not more ammonium chloride, sal-ammoniac, is added and the reaction continued until the calcium fluoride is all decomposed. Then the mass is allowed to cool and when cold the calcium chloride formed is removed by washing the residual titanium sub-oxide with a dilute solution of hydrochloric or hydrofluoric acid in water or with water alone. If desired one may use sodium or potassium fluoride in place of the calcium fluoride. In this example ammonium fluoride is apparently formed in situ and this ammonium fluoride reacts with the silicon oxygen compounds to open them up. If desired one may use the ammonium fluoride of commerce instead of generating it in situ but for reasons of economy and for other reasons I usually prefer to operate as per the above example.

Example 3

One moistens, with 140 parts of water, 100 parts of the sub-oxide material, such as was used in Example 1, and adds slowly while stirring 27 parts of a 30 per cent solution of hydrofluoric acid; all parts being by weight.

This reaction may be carried out in a well paraffined wooden tank, or in one impregnated with bakelite or similar resisting varnish, and in which the wet mass can be well agitated until the reaction is ended. The reaction generally takes place at ordinary temperatures but it may take 24 hours to complete it. Warming the mass apparently increases the speed of the reaction. The operation may, if desired, be conducted under a less than atmospheric pressure. The weak hydrofluoric acid does not seriously attack the sub-oxide at ordinary temperatures but it opens up the silicates or other refractory material leaving it in an apparently open or sponge like condition so that it can be conveniently acted upon by other reagents.

If desired the leaching with dilute acid may take place in steps or stages and in which variations in acid concentration, kind of acid, time of treatment, pressure, degree of agitation and temperature may exist or if desired the process may be repeated under the conditions as given or under different ones. I have found that it is often economical to use acids up to 10 per cent hydrogen fluoride content, or even stronger, in this leaching but for reasons of safety I usually limit myself to acids of about 5 per cent hydrogen fluoride content or even lower.

I do not however limit myself to the conditions as given in the three examples nor to the apparatus employed as these may be varied by one skilled in the art. Neither do I wish to be limited to the explanations I have given but only to the facts as they are.

Now having described my invention what I claim is:

1. Method for purifying titanium sub-oxide containing materials by acting upon the therein contained siliceous impurities with substances capable of reacting with the impurities to form compounds containing fluorine, under such conditions as not to appreciably attack the titanium compounds, and removing the so formed fluorine compounds.

2. Method for purifying titanium sub-oxide containing materials by acting upon the therein contained silicon and oxygen containing impurities with an aqueous solution of hydrogen fluoride of such concentration as not to appreciably attack the titanium sub-oxide but of such strength as to open up, i. e. to attack, the impurities and then removing the soluble reaction products.

3. Method for purifying titanium sub-oxide containing materials by acting upon the therein contained siliceous impurities with substantially anhydrous hydrogen fluoride under such conditions as not to appreciably attack the titanium sub-oxide and then removing the soluble reaction products by washing.

4. Method for purifying titanium sub-oxide containing materials by acting upon the therein contained ferrogeneous silicates with substantially anhydrous hydrogen fluoride generated in situ by the action of an inorganic acid substance upon the fluoride of a basic metal, and under such conditions as not to appreciably attack the titanium sub-oxide and then removing the soluble reaction products by washing.

5. Method for purifying titanium sub-oxide containing materials by acting upon the therein contained silicates with ammonium fluoride under such conditions as not to appreciably attack the titanium sub-oxide and then removing the soluble reaction products by washing with acidulated water.

6. Method for purifying titanium sub-oxide containing material by acting upon the therein colored siliceous materials with ammonium fluoride, generated in situ by the action of ammonium chloride upon the fluoride of a basic metal, under such conditions as not to appreciably attack the titanium sub-oxide and then removing the soluble reaction products by washing with water containing a little hydrochloric acid.

FOORD von BICHOWSKY.